United States Patent
Zavattari et al.

(10) Patent No.: US 6,941,940 B1
(45) Date of Patent: Sep. 13, 2005

(54) WIRE SAW AND PROCESS FOR SLICING MULTIPLE SEMICONDUCTOR INGOTS

(75) Inventors: Carlo Zavattari, Novara (IT); Ferdinando Severico, Novara (IT); Paolo De Maria, Novara (IT)

(73) Assignee: MEMC Electronic Materials, S.p.A., Novara (IT)

( * ) Notice: Subject to any disclaimer, the term of this patent is extended or adjusted under 35 U.S.C. 154(b) by 186 days.

(21) Appl. No.: 10/296,919

(22) PCT Filed: May 31, 2000

(86) PCT No.: PCT/IT00/00223

§ 371 (c)(1), (2), (4) Date: Apr. 17, 2003

(87) PCT Pub. No.: WO01/91981

PCT Pub. Date: Dec. 6, 2001

(51) Int. Cl.[7] .................................................. B28D 1/08
(52) U.S. Cl. ..................... 125/16.02; 125/21; 125/35
(58) Field of Search ........................... 125/16.01, 16.02, 125/12, 21, 22, 14, 35

(56) References Cited

U.S. PATENT DOCUMENTS

| | | |
|---|---|---|
| 4,191,159 A | 3/1980 | Collins |
| 5,616,065 A | 4/1997 | Egglhuber |
| 5,720,271 A | 2/1998 | Hauser |
| 5,829,424 A | 11/1998 | Hauser |
| 5,839,424 A | 11/1998 | Hauser |
| 5,839,425 A | 11/1998 | Toyama et al. |
| 5,904,136 A | 5/1999 | Nagatsuka et al. |
| 5,913,305 A | 6/1999 | Hauser |
| 5,937,844 A | 8/1999 | Kiuchi et al. |
| 6,041,766 A * | 3/2000 | Vojtechovsky ............ 125/16.02 |
| 6,283,111 B1 * | 9/2001 | Onizaki et al. .......... 125/16.01 |
| 6,381,830 B1 * | 5/2002 | Chikuba et al. ......... 125/16.02 |

FOREIGN PATENT DOCUMENTS

| | | |
|---|---|---|
| EP | 0433956 A1 | 6/1991 |
| EP | 0824055 A1 | 2/1998 |
| EP | 0983831 A2 | 3/2000 |
| JP | 60227423 | 11/1985 |
| JP | 61100366 | 5/1986 |
| JP | 62251062 | 10/1987 |
| JP | 2000108007 | 4/2000 |

* cited by examiner

Primary Examiner—Hadi Shakeri
(74) Attorney, Agent, or Firm—Senniger Powers

(57) ABSTRACT

A wire saw (10) for simultaneously slicing multiple, generally cylindrical monocrystalline ingots (14) into wafers. The wire saw includes a cutting head (16), an ingot support (12), and multiple generally parallel lengths of cutting wire (18) defining a cutting web (30). A slurry delivery system includes nozzles (34, 36, and 38) positioned for dispensing slurry along the wire web generally at lateral sides of each ingot. A process for simultaneously slicing at least two generally cylindrical semiconductor ingots into wafers includes mounting at least two ingots to a common ingot support, moving the ingot support relative to the cutting web so that the two ingots simultaneously press against the cutting web at cutting regions, and dispensing a liquid slurry to at least three locations on the wire web including two outermost sides of the cutting regions and a location between each pair of ingots.

12 Claims, 6 Drawing Sheets

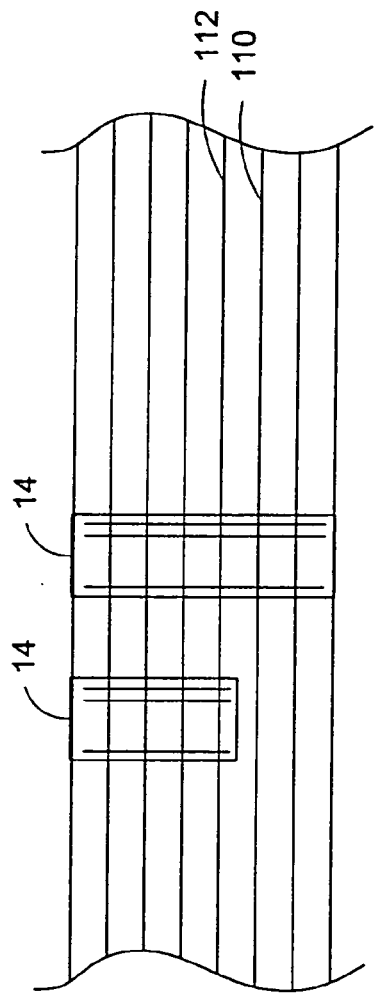
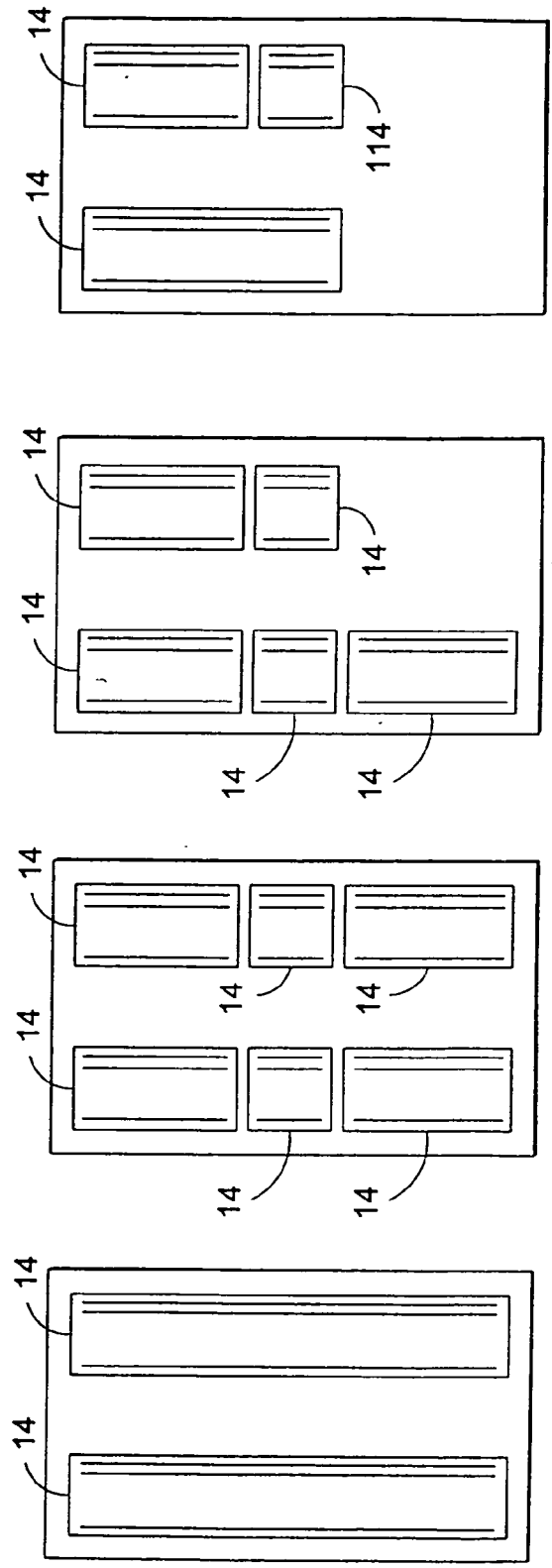

WIRE SAW AND PROCESS FOR SLICING MULTIPLE SEMICONDUCTOR INGOTS

BACKGROUND OF THE INVENTION

This invention relates generally to cutting monocrystalline semiconductor ingots into multiple wafers, and in particular to an apparatus and method for simultaneously slicing at least two semiconductor ingots to improve throughput.

Semiconductor wafers are generally prepared from a single crystal ingot, such as a silicon ingot, that is cylindrical in shape. The ingot is sliced in a direction normal to its longitudinal axis to produce as many as several hundred thin, disk-shaped wafers. The slicing operation may be accomplished by means of a wire saw, wherein the ingot is contacted with a reciprocating wire while a liquid slurry containing abrasive grains is supplied to a contact area between the ingot and the wire. As the abrasive particles in the slurry are rubbed by the wire against the ingot, silicon crystal is removed and the ingot is gradually sliced. The wire saw provides a gentle mechanical method for slicing which makes it ideal for cutting silicon crystal, which is brittle and could be damaged by other types of saws (e.g., conventional internal diameter saws). After slicing, each wafer is subjected to a number of processing operations to reduce the thickness, remove damage caused by the slicing operation, and create a flat and highly reflective surface suitable for installation of integrated circuit devices.

Wire saws generally have three or four rollers which are rotatably mounted on a frame, each roller having guide grooves for receiving segments of wire. Multiple parallel lengths of the wire extend between two of the rollers to form a wire web for slicing the ingot into multiple wafers. The space between adjacent wires in the web generally corresponds to the thickness of one wafer before processing. The apparatus includes an ingot support that may mount one silicon ingot and is adjustable to accurately align an orientation of the crystalline structure of the ingot relative to a cutting plane. The support is moveable in translation to bring the ingot into contact with the wire web.

Slurry is transported from a nearby slurry container to the wire by a pump, tubing, and at least one nozzle which dispenses slurry onto the wire web. A portion of the slurry then moves with the wire into a contact area between the wire and the ingot where the silicon crystal is cut. Typically, there are two nozzles positioned on opposite sides of the ingot holder so that slurry is dispensed onto the web on both sides of the ingot, thus facilitating delivery of slurry to the cutting region for either direction of travel of the reciprocal wire. Each nozzle is positioned above the wire web at close spacing and configured to dispense slurry in a generally thin, linear distribution pattern, forming a curtain or sheet of slurry. The slurry curtain extends across a full width of the wire web so that slurry is delivered to every reach of wire and every slice in the ingot.

A substantial concern when slicing semiconductor ingots is maintaining flatness of the wafers that are cut by the wire saw. One key to avoiding thickness variation and warp on wafer surfaces is controlling build up of frictional heat at the contact area, or cutting region. Accordingly, the liquid slurry is actively cooled prior to dispensing on the wire web so that it may remove heat as it passes through the cutting region. A heat exchanger is typically located between the container and the nozzle for cooling the slurry.

A limitation to the process of slicing semiconductor ingots is that it requires a substantial amount of time and can become a hindrance to the efficient production of wafers. It is desirable to slice the ingots as quickly as possible to improve throughput and reduce costs, yet there have been difficulties implementing a more rapid wire sawing process. The speed of the cutting wire cannot be substantially increased because that would elevate temperature at the cutting region to the detriment of the flatness of the wafers.

Thus, there is presently a need for improving the throughput of wire saws without compromising quality of the wafers cut.

SUMMARY OF THE INVENTION

Among the several objects and features of the present invention may be noted the provision of an apparatus and process to improve throughput in slicing semiconductor ingots into wafers; the provision of such an apparatus and process that simultaneously slice multiple ingots; the provision of such an apparatus and process to produce flat, high quality wafer slices; the provision of such an apparatus and process that slice multiple ingots having different lengths; and the provision of such an apparatus and process that is economical.

In general, a wire saw of the present invention simultaneously slices multiple, generally cylindrical monocrystalline ingots into wafers. The wire saw comprises a frame including a cutting head and an ingot support. The cutting head comprises a cutting wire adapted to cut through the ingots and wire guide rollers mounted on the frame and supporting the wire for lengthwise movement of the wire. The wire is supported by the rollers in reaches between adjacent rollers. Each reach includes multiple generally parallel lengths of the wire for cutting multiple wafers from the ingots, at least one of the reaches defining a cutting web. The ingot support is adapted for mounting at least two ingots thereon in registration with the cutting web and with longitudinal axes of the ingots generally perpendicular to the lengthwise extent of the wire in the cutting web. The frame mounts the cutting head and ingot support for relative motion such that the ingots mounted on the ingot support pass through the cutting web as the wire is driven in a lengthwise direction for substantially simultaneous slicing of wafers from the ingots by the wire.

In another aspect, a process of the present invention simultaneously slices at least two generally cylindrical semiconductor ingots into wafers using a wire saw having a moveable cutting wire arranged in generally parallel reaches between guide rollers. At least one of the reaches defines a cutting web, the wire being adapted to cut through the ingots. The process comprises the steps of mounting at least two ingots to a common ingot support so that the ingots are positioned in registration with the cutting web and with longitudinal axes of the ingots generally perpendicular to the lengthwise extent of the wire in the cutting web. The ingot support is moved relative to the cutting web so that the at least two ingots simultaneously press against the cutting web at cutting regions where the ingots engage the wire web. A liquid slurry is dispensed to at least three locations on the wire web, the locations including two outermost sides of the ingot cutting regions and a location between each pair of ingots.

Other objects and features of the present invention will be in part apparent and in part pointed out hereinafter.

BRIEF DESCRIPTION OF THE DRAWINGS

FIG. 10 is a schematic plan view of a cutting wire web in relation to two ingots of different lengths;

FIG. 11 is a schematic plan view of a first example of a paired combination of ingots that does not have need for a central support;

FIG. 12 is a schematic plan view of a second example of a paired combination of ingots that does not have need for a central support;

FIG. 13 is a schematic plan view of a third example of a paired combination of ingots that does not have need for a central support; and FIG. 14 is a schematic plan view of a fourth example of a paired combination of ingots that does not have need for a central support.

Corresponding reference characters indicate corresponding parts throughout the views of the drawings.

DETAILED DESCRIPTION OF THE PREFERRED EMBODIMENT

Figure 1:
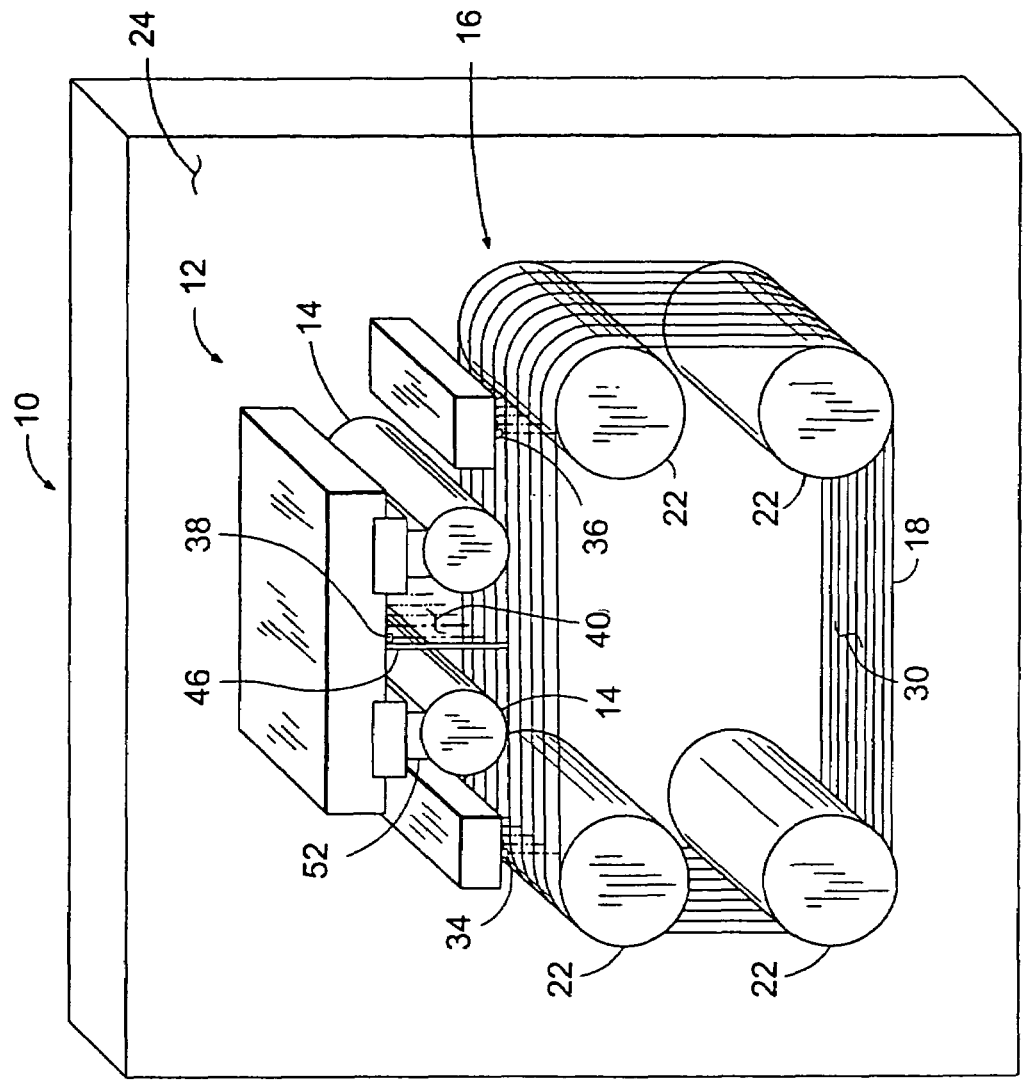
FIG. 1 is a schematic perspective view of a wire saw of the present invention having two semiconductor ingots mounted thereon.

Referring now to the drawings and in particular to FIG. 1, a wire saw of the present invention for simultaneously slicing a plurality of semiconductor ingots into wafers is indicated generally at 10. The wire saw 10 has an ingot support generally indicated at 12 for holding ingots 14. A cutting head indicated generally at 16 mounts a wire 18 for reciprocal movement to cut ingots. The ingot support 12 is configured for holding conventional monocrystalline silicon ingots 14, which are generally cylindrical in shape, in a generally side-by-side arrangement with longitudinal axes of the ingots being non-collinear and approximately parallel. Ingots 14 are sliced when they are engaged against the moving cutting wire 18 in the presence of an abrasive liquid slurry. The ingot support 12 and cutting head 16 are moveable relative to each other so that the ingots 14 may be moved into or out of engagement with the cutting wire 18, and other relative movements between the cutting head and ingot support to facilitate cuffing as are known to those of ordinary skill in the art.

The cutting head 16 includes rotatable wire guiding rollers 22 around which the cutting wire 18 is looped for circuitous motion around the rollers. Preferably, there are four guiding rollers 22 in a generally rectangular arrangement, although saws having fewer or greater number of rollers and at other arrangements do not depart from the scope of this invention. The ingot support 12 is positioned generally above the rectangular arrangement of the rollers 22, so that the ingots 14 are engageable against only a topmost section of cutting wire 18 extending between the two uppermost rollers. However, the ingot support 12 could be positioned anywhere about the rollers 22 so that the ingots 14 may engage any section of wire 18. Preferably, the ingot support 12 and cutting head 16 are mounted on a common support frame 24, with the cutting head being fixed relative to the frame while the ingot support is moveable relative to the frame. As slicing is accomplished the ingots 14 gradually move through the cutting wire 18 as the wire penetrates the ingots. The ingot support 12 continues moving generally toward the cuffing head 16 to keep the ingots 14 engaged against the wire 18 at a contact area within each slice.

The cutting wire 18 is supported by the rollers in multiple generally parallel reaches between the rollers 22 for cutting multiple wafers from the ingots 14. Each of the reaches includes multiple generally parallel lengths of wire 18, each length cutting one slice in each ingot. Collectively the parallel reaches of the wire 18 on the guide rollers 22 define a cutting web, indicated generally at 30. The wire web 30 may have as many as several hundred parallel lengths of wire 18 for cutting a corresponding number of slices, although a web formed of any number of lengths does not depart from the scope of this invention. At least one of the rollers 22 is connected to a motor or other suitable drive mechanism (not shown) for providing power to drive the wire 18 in a lengthwise direction for operation of the wire saw 10. Each roller 22 has a plurality of annular grooves (not shown) around its circumference adapted for receiving the lengths of the cutting wire 18. The wire reciprocates in lengthwise motion as driven by the rollers 22. As known to those skilled in the art, the wire 18 moves in a forward direction for a first predetermined time or length displacement, and then moves in a reverse direction for a second predetermined time or length displacement. The wire 18 may extend in a conventional manner into a take up reel and a discharge reel (not shown) for collecting excess length of the wire that is not presently looped around the guide rollers 22.

The wire saw 10 has a slurry system for supplying an abrasive liquid slurry to a portion of the wire web 30 for delivery along the wire 18 to contact regions between the wire and the ingots 14. In the preferred embodiment, three nozzles 34, 36, 38 are positioned for dispensing the slurry onto the wire. Each nozzle is configured in a conventional manner, as known to those skilled in the art, generally as a slit that dispenses slurry downwardly in a thin, planar distribution pattern forming a curtain or sheet 40. The curtain 40 of slurry is oriented perpendicular to the wire 18 and has a length that is approximately the same as a width of the wire web 30. Each nozzle 34, 36, 38 receives slurry from a suitable slurry container, a pump, and a length of tubing (not shown), each of these elements being conventional in nature and operable to transport slurry from the container to the nozzles. The system can include a manifold directly adjacent each nozzle for holding a small quantity of slurry. During operation, a total flow of slurry may be actively distributed at any different proportions among the nozzles 34, 36, 38, or may be passively distributed in equal portions therebetween.

To control heat, the liquid slurry is actively cooled prior to dispensing on the wire web 30. As known to those skilled in the art, a heat exchanger (not shown) is located either between the slurry container and each nozzle or at the container. In practice, it has been found useful when slicing two or more ingots 14 at the same cutting speed as with one ingot to cool the slurry to a temperature of 25° C., whereas 30° C. slurry is typically provided for slicing a single ingot. This is accomplished in the present invention by the inclusion of a second heat exchanger in the container. However, a single larger heat exchanger or other cooling mechanisms and temperatures do not depart from the scope of this invention.

The nozzles 34, 36, 38 are positioned so that slurry is carried by the wire 18 into the contact area between the wire and each ingot 14 for either direction of travel of the wire. As shown in FIG. 1, first and second nozzles 34, 36 are positioned generally above the wire web 30 on opposite sides of the ingot support 12 so that slurry is dispensed onto the wire web on both sides of the ingot support. The first and second nozzles 34, 36 are preferably mounted to the support frame at a fixed position relative to the cutting head 16, and they do not move along with the ingot support 12 as it moves relative to the cutting head. The first and second nozzles 34, 36 are located at a suitable close spacing (such as 2 cm) above the wire web 30 so that slurry falls upon every length of wire 18, including particularly the lengths on each end extremity of the width of the web 30. The slurry is preferably collected and recycled in a conventional manner.

The present invention further includes the third nozzle 38 (FIG. 1) positioned generally above the wire web 30 and mounted on the ingot support 12. Although wire saws of the prior art for slicing a single ingot have included first and second nozzles 34, 36, the third nozzle 38 is included in the present invention to provide delivery of adequate quantity and distribution of slurry to two ingots 14. Each ingot receives slurry on both lateral sides of the ingot. Because the third nozzle 38 is attached to the ingot support 12, the third nozzle moves along with the ingot support as it moves relative to the cutting head 16. Nozzles having other locations and mounts do not depart from the scope of this invention.

Two bars 46 extend vertically downward from opposite ends of the third nozzle 38 to inhibit bunching of the slurry and facilitate good slurry distribution. Only one of the bars 46 is visible in FIG. 1. Unlike the first and second nozzles 34, 36, which are fixed at a closely-spaced position above the wire web 30, the third nozzle 38 moves with the ingot support 12 to a substantial distance from the wire (such as 30 cm). The thin curtain of slurry 40 dispensed from the third nozzle thus falls a farther distance before reaching the wire. In practice, an unbounded curtain of slurry naturally tends to coalesce in shape as it descends, bunching toward a narrower profile. The slurry dispensed from the nozzle 38 may fall a distance sufficient for the original linear pattern to degrade so that slurry does not fall upon lengths of wire near each end extremity of the web 30.

The bars 46 correct this problem by providing a surface against which an edge of the curtain 40 of slurry adheres due to surface tension effects or other fluid dynamics. In practice, inclusion of the bars 46 has inhibited the tendency of the slurry to coalesce and has resulted in substantially maintaining the original width of the slurry until it reaches the wire web 30. Thus, the slurry is distributed to every length of wire 18, including particularly the lengths on each end extremity of the width of the web, so that slurry is delivered to every slice in the ingot. The bars 46 are generally thin in construction and positioned to extend from each end of the third nozzle 38. The bars 46 do not interfere with motion of the wire web 30 when the ingot support 12 is moved toward the web. The bars 46 may have a variety of section shapes, diameters, and lengths. Preferably, the length is about equal to a maximum operating distance between the third nozzle 38 and the wire web 30.

Figure 2:
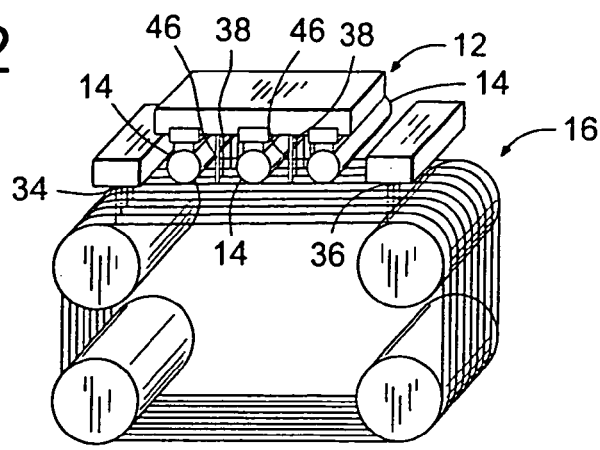
FIG. 2 is a schematic perspective view of the wire saw having three ingots mounted thereon.

The wire saw 10 may hold two or three ingots 14 in a side-by-side, horizontal arrangement, as shown in FIGS. 1 and 2, respectively, or may hold a single ingot as in a conventional wire saw. Although the ingot support 12 may be used with differently sized ingots, in practice in has been useful for holding two 150 mm diameter ingots (FIG. 1), three 100 mm diameter ingots (FIG. 2), or a single 300 mm diameter ingot. The nozzles for dispensing slurry are numbered in an amount of at least one more than the number of side-by-side ingots 14. For example, with two ingots 14, there are three nozzles 34, 36, 38. With three ingots 14, there are four nozzles. The ingots and the nozzles are arranged in alternating relative positions so that slurry is dispenses at distinct locations generally at lateral sides of every ingot is 14.

Figure 3:
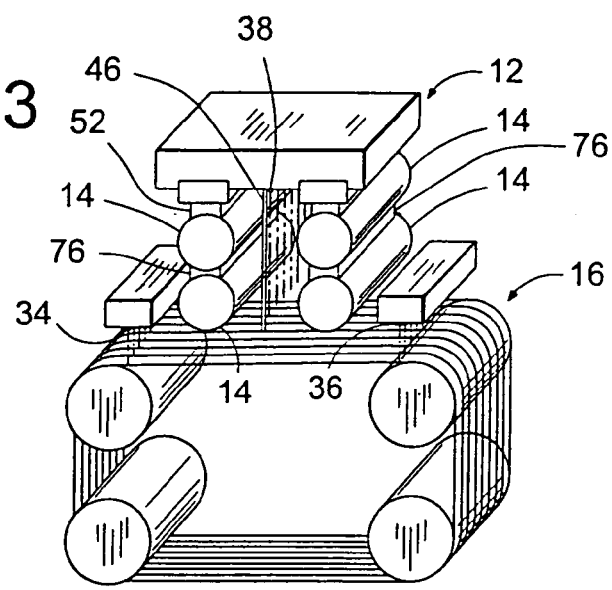
FIG. 3 is a schematic perspective view of the wire saw having a stacked arrangement with four ingots mounted thereon.
Figure 4:
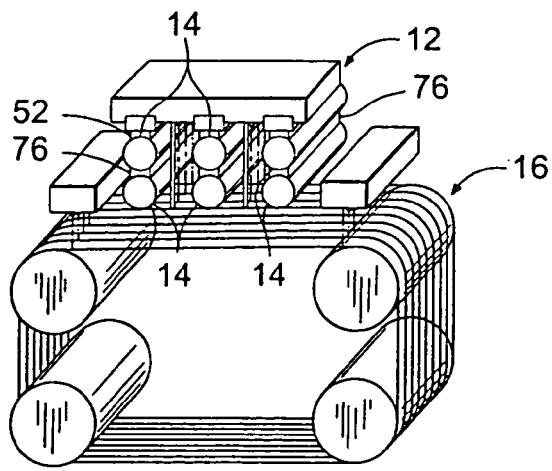
FIG. 4 is a schematic perspective view of the wire saw having a stacked arrangement with six ingots mounted thereon.

The ingot support 12 may hold up to four or six ingots, as shown in FIGS. 3 and 4, respectively, when pairs of ingots are stacked generally vertically. Stacking reduces down-time of the wire saw because it increases the number of ingots 14 sliced before it is necessary to stop operation to load new ingots or change 20 configurations, thus providing improved efficiency. After lower ingots are sliced, operation may continue to slice upper ingots. It is understood, however, that other arrangements, including any number of ingots and non-horizontal and non-vertical relative ingot positions, do not depart from the scope of this invention.

Figure 5:
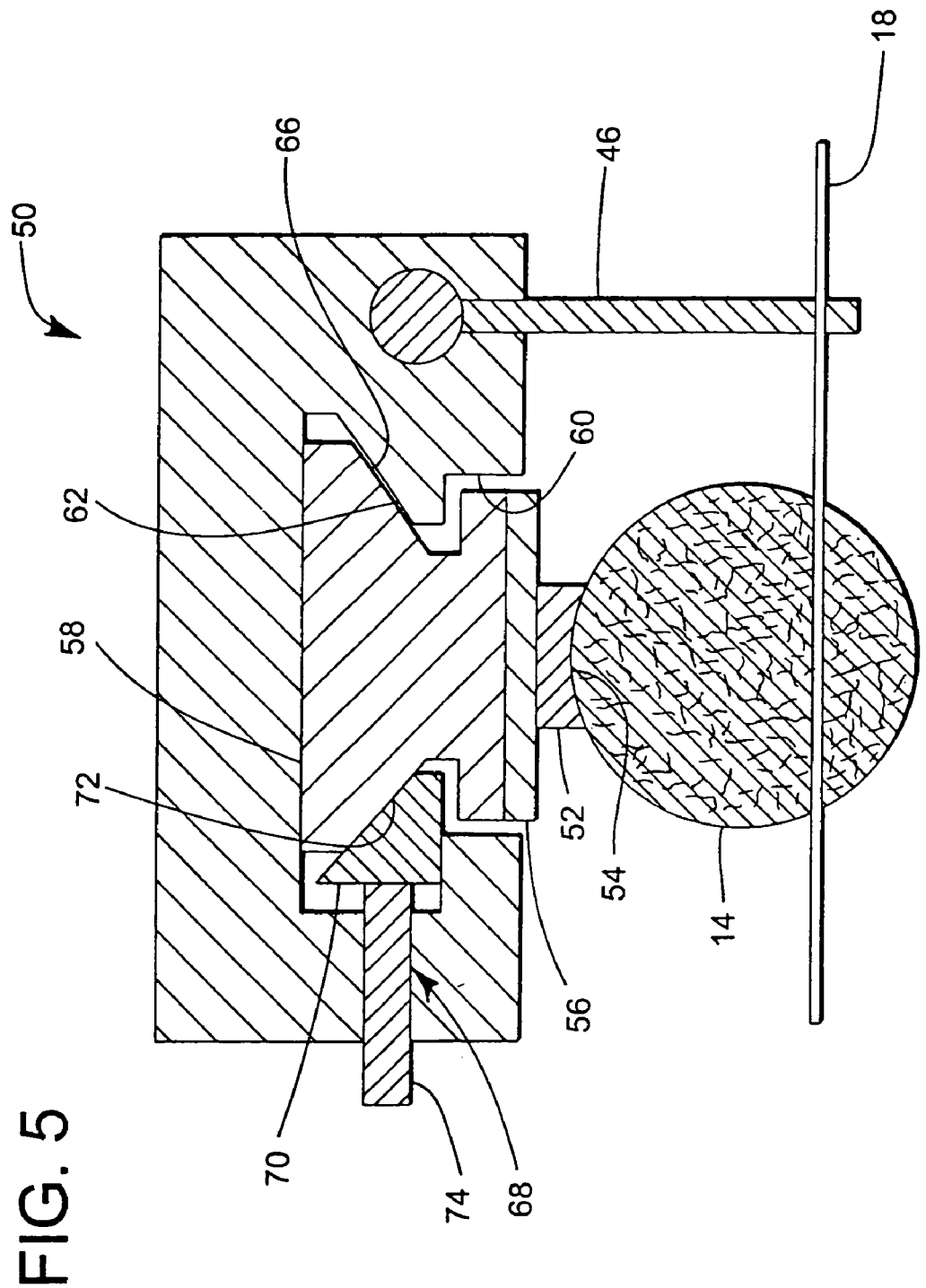
FIG. 5 is an enlarged, schematic sectional view of a structure for attaching ingots to an ingot support.

Referring now to FIG. 5, a preferred structure for attaching ingots 14 to the ingot support 12 is indicated generally at 50. Each ingot is attached by a conventional epoxy to a mounting beam 52 having a concave surface 54 corresponding to the convex, cylindrical outer surface of the ingot 14. As known to those skilled in the art, the crystallographic plane of the silicon crystal lattice is carefully oriented relative to the mounting beam 52 using x-rays or other suitable technique to a close angular tolerance such as within one-fourth of one degree. The mounting beam 52 is adapted for connection to a plate 56 that is in turn connectable to a dove tail support 58.

The ingot support 12 has a receptacle along its lower side in the form of a slot 60. An internal shoulder 62 with a sloped surface is located within the slot. The dove tail support 58 is receivable in the slot 60, wherein a first sloped surface 66 on the support 58 slidably engages the sloped surface on the shoulder 62. A clamp, indicated generally at 68, is provided for locking the support 58 at a fixed position in the slot. The clamp includes an engaging block 70 having a sloped surface that is engageable against a second sloped surface 72 on the support 58. A shaft 74 connects the block 70 to a mechanical or hydraulic actuator (not shown). The block 70 and shaft 74 are moveable between an unlock position where the block does not press against the dove tail support 58 and the support can be moved lengthwise in the slot 60, and a locked position where the block presses against the dove tail support and the support is at a fixed position in the slot. Other structures for attaching ingots to the ingot support do not depart from the scope of this invention.

For the stacked configurations of FIGS. 3 and 4, pairs of ingots are joined by epoxy to an intermediate mounting beam 76 that is sandwiched between the ingots 14. Each of these mounting beams 76 has concavely-shaped upper and lower surfaces, corresponding to the convex shape of the cylindrical outer surface of each ingot 14. The stacked pairs of ingots are carefully oriented so that their respective crystallographic planes are aligned.

Figure 6:
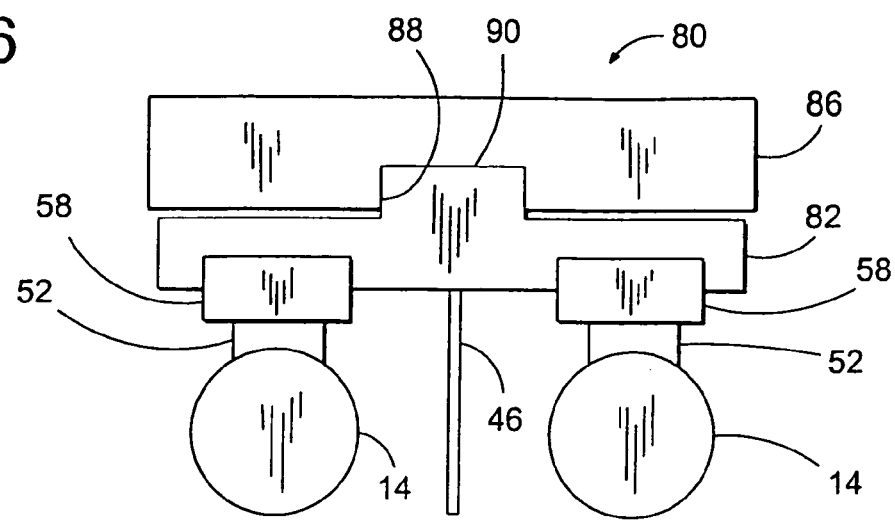
FIG. 6 is a schematic elevational view of a second embodiment of the present invention having a double adaptor for holding two ingots.
Figure 7:
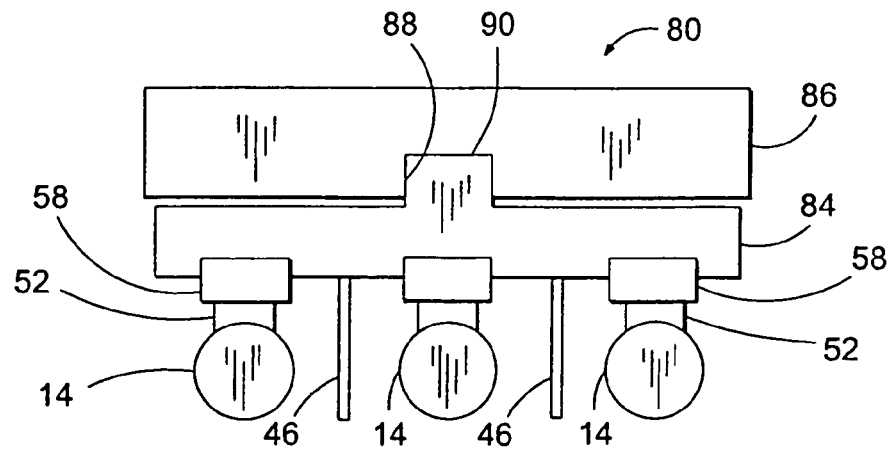
FIG. 7 is a schematic elevational view of the second embodiment with a triple adaptor for holding three ingots.

A second embodiment of the invention is shown schematically and indicated generally at 80 in FIGS. 6 and 7. The second embodiment 80 includes adaptors 82, 84 for readily converting the wire saw between configurations for slicing one, two, or three side-by-side ingots 14. The ingot support 12 has a common loading platform or head 86 with a receptacle along its lower side in the form of a slot 88. Although the slot 88 may have a variety of shapes or structure for attaching ingots, preferably the slot is configured as discussed above for the slot receptacle 60 on the ingot support 12 of the first embodiment, and as shown in FIG. 5. A double adaptor 82 (FIG. 6) is configured for holding two ingots 14, although it can also hold only one ingot, or in a stacked configuration, three or four ingots. The double adaptor 82 has a mounting ridge 90 on its upper surface that is engageable in the slot 88 of the head 86. Preferably, the ridge 90 is shaped as a dove tail support 58 as in FIG. 5. A triple adaptor 84 (FIG. 7) is configured for holding three ingots 14, although it can also hold one or two ingots, or in a stacked configuration, from four to six ingots. The triple adaptor 84 also has a mounting ridge 90 of the same size as that on the double adaptor 82. The invention provides flexibility in that the slot 88 is configured to receive and lock therein either: a) support 58 for mounting a single ingot 14 for sawing a single ingot, b) the ridge 90 of the double adaptor 82 for sawing two ingots, or c) the ridge 90 of the triple adaptor 84 for sawing three ingots. There may be other adaptors, including those with different structure or for holding four or more side-by-side ingots, without departing from the scope of this invention.

Figure 8:
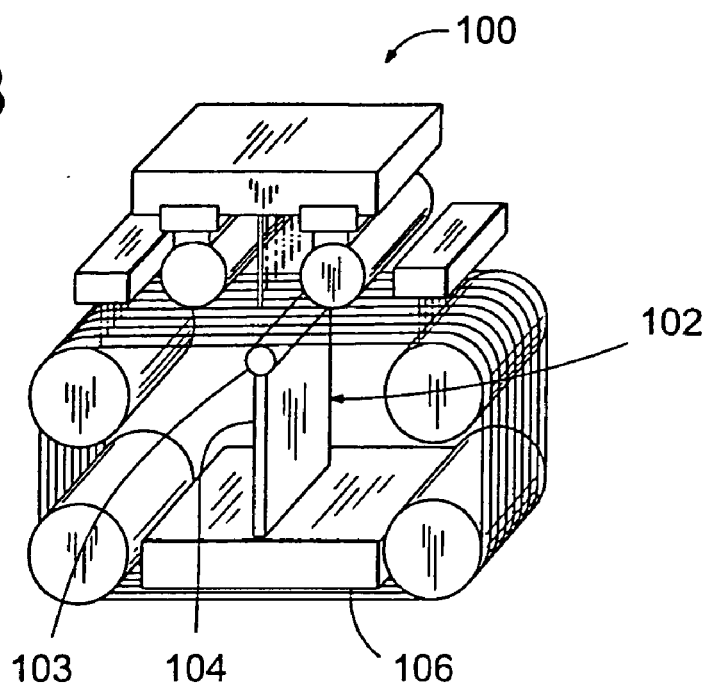
FIG. 8 is a schematic perspective view of a third embodiment of the present invention having a central support with a single vertical member.
Figure 9:
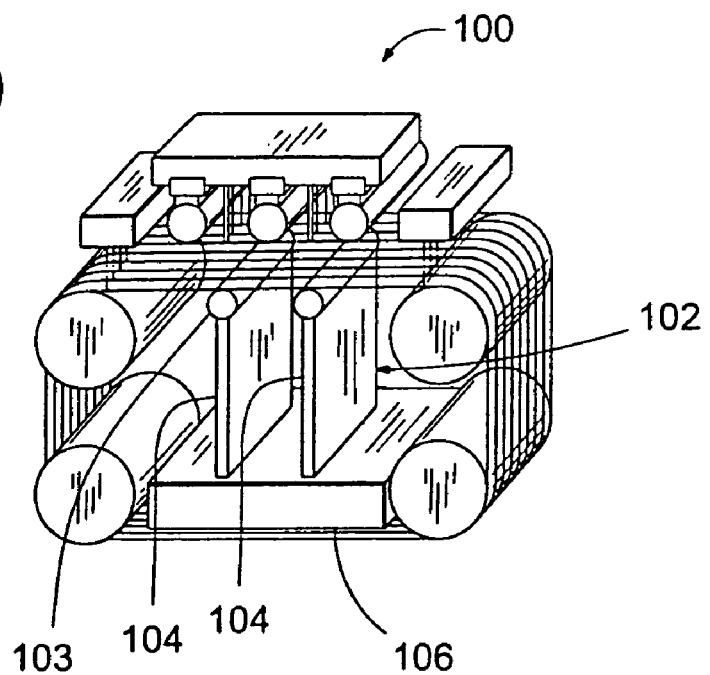
FIG. 9 is a schematic perspective view of the third embodiment having a central support with two vertical members.

A third embodiment of the invention is shown schematically and indicated generally at 100 in FIGS. 8 and 9. The third embodiment 100 has a central support (designated generally at 102) configured to limit deflection of the wire web 30 when it is engaged by one or more ingots 14. The central support 120 comprises at least one obstruction to free vertical deflection of wire, and it is preferably fixed relative to the rollers 22 of the cutting head 16. The central support 102 is located generally within an interior of a rectangular shape defined by the wire web 30 and adjacent the wire web on an opposite side of the wire web from the ingots 14. The central support 102 has a generally vertical member 104 that is attached to a platform 106. The platform 106 is preferably mounted to the common support frame 24.

The central support 102 has a suitable upper end 103 for permitting wire 18 to engage and move therepast, such as a plurality of rollers, and it extends across the full width of the wire web 30. For the double adaptor 82, a single vertical member 104 is provided (FIG. 8), and for the triple adaptor 84, two vertical members 104 are provided (FIG. 9). Each central support 102 is located so that it is about equally spaced between two ingots 14. When the ingot support 12 moves downwardly and one or more ingots engage the wire web 30, the web is deflected until it engages the central support. The wire 18 will not deflect further at the location where it engages the central support 102. The central support may have a different construction, particularly including obstructions of other shapes or with no vertical members 104, without departing from the scope of this invention.

A problem when there is no central support 102, as in the first embodiment, is that the yield of wafers is detrimentally reduced when two (or three) ingots that are simultaneously sliced have different lengths. If there are two ingots in side-by-side arrangement and the lengths of these ingots are not substantially equal, then at least some lengths of the wire 18 will engage one ingot while other lengths of wire engage two ingots. As shown schematically in FIG. 10, the length of wire numbered 110 is engaged by one ingot while the length of wire numbered 112 is engaged by two ingots. The space between adjacent lengths of wire is exaggerated in FIG. 10 for clarity. The lengths 110 and 112 will have different deflection patterns and different tension force in the wire. Wafers that are sliced from the longer ingot by reaches of wire that are in a transition region where the wire tension changes do not receive even slicing, resulting in warp or poor wafer quality. As a result, operators are forced to slice only ingots with substantially equal lengths, or in multiple ingot pairs having substantially equal lengths, as shown in FIG. 11.

The combinations of ingot lengths shown in FIGS. 11 through 14 do not degrade yield, while the combination of FIG. 10 does result in degraded yield. The combination of FIG. 10 has a longer ingot that extends continuously past a position where a shorter ingot ends and no other ingot is located. In contrast the combinations of FIGS. 11 through 14 nowhere have a longer ingot that extends through a transition region near the end of a shorter ingot. Therefore there are no wafers sliced from a longer ingot that are affected by different wire tensions. On FIG. 14, a combination of two ingots 14 having different length must be sliced with the addition of a scrap rod 114. The scrap rod 114 must have the same external diameter as the ingots 14 being sliced, and must extend at least to the full length of the longer ingot. The scrap rod 114 does not need to be silicon, but can be a different material. The scrap rod provides a uniform wire deflection across an entire length of the longer ingot.

The central support 102 prevents this problem by precluding the influence of ingot length on the wire tensions. Because the central support 102 extends across the entire width of the wire web 30, all reaches engage the central support. That results in locally uniform deflections and tensions to maintain even slicing, low warp, and high yield. The central support permits operators to simultaneously slice ingots of varying lengths, such as in FIG. 10.

In operation, the wire saw 10 of the present invention simultaneously slices at least two generally cylindrical semiconductor ingots 14 into wafers. First, each ingot is attached to a mounting beam 52 by a suitable epoxy. This can be accomplished in a conventional manner with a separate device that uses x-rays for carefully aligning the crystallographic plane of the ingot relative to the mounting beam within a close tolerance. The mounting beams are each attached to dove tail supports 58 and secured to the ingot support 12 by inserting the dove tail in slots 60 and locking the clamps. The ingots 14 are automatically positioned to be in registration with the cutting web 30 and with longitudinal axes of the ingots generally perpendicular to the lengthwise extent of the wire. If an adaptor 82 or 84 of the second embodiment 80 is used, two or three mounting beams are secured to the adaptor, and then the adaptor is attached to the head 86 by securing the ridge 90 in the slot 88. The ingot support 12 is moved relative to the cutting web so that the ingots simultaneously press against the cutting web at cutting regions where the ingots engage the wire. The liquid slurry is dispensed from nozzles 34, 36, 38 to the wire web at locations including two lateral sides of each ingot. When a stacked arrangement is used, additional ingots and mounting beams are aligned and attached to the first mounting beams, generally before attaching to the ingot support.

The apparatus may be readily configured for slicing a single 300 mm diameter ingot, from one to four 150 mm diameter ingots, or from one to six 100 mm diameter ingots. For slicing two ingots in side-by-side arrangement, it has been found that productivity is double that of previous wire saws, while wafer flatness and quality are maintained at the same level.

In view of the above, it will be seen that the several objects of the invention are achieved and other advantageous results obtained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A process for simultaneously slicing at least two generally cylindrical semiconductor ingots into wafers using a wire saw having a moveable cutting wire arranged in generally parallel reaches between guide rollers, at least one of the reaches defining a cutting web, the wire being adapted to cut through the ingots, the process comprising the steps of:

mounting said at least two ingots to a common ingot support so that the ingots are positioned in registration with the cutting web and with longitudinal axes of the ingots being generally parallel, non-coaxial, and generally perpendicular to the lengthwise extent of the wire in the cutting web, said ingot support including at least two mounting beams, each adapted for connection of a respective ingot thereto, a loading platform and an adaptor for holding said mounting beams, the platform having one receptacle configured to receive said adaptor and configured to receive one of the mounting beams free from said adaptor for mounting a single ingot for sawing;

moving the ingot support relative to the cutting web so that said at least two ingots simultaneously press against the cutting web at cutting regions where said ingots engage said wire web;

dispensing a liquid slurry to at least three locations on said wire web, said locations including two outermost sides of said ingot cutting regions and a location between each pair of ingots; and removing said adaptor from said receptacle of the ingot support and installing either a second adaptor or one mounting beam free from said adaptor into said receptacle for slicing at least one additional ingot.

2. A process as set forth in claim 1 further comprising cooling said slurry to a uniform temperature of about 25° C. or less prior to dispensing.

3. A process as set forth in claim 1 further comprising a step of mounting at least two ingots in a stacked arrangement wherein said at least two ingots are generally parallel with a first ingot positioned closer to the cutting web than a second, stacked ingot.

4. A process as set forth in claim 1 wherein said at least two ingots have different lengths, and further comprising a step of mounting a scrap rod to the ingot support, the scrap rod being aligned with a shorter of the ingots and having a length so that a combined length of the shorter ingot and the scrap rod is at least as long as a longer of the ingots.

5. A process as set forth in claim 1 further comprising obstructing movement of the cutting web caused by said step of moving the ingot support to press the ingots against the cutting web for limiting deflection of the web.

6. A wire saw for slicing generally cylindrical monocrystalline ingots into wafers, the wire saw comprising:

a frame including a cutting head and an ingot support;

the cutting head comprising a cutting wire adapted to cut through the ingots, wire guide rollers mounted on the frame and supporting the wire for lengthwise movement of the wire, the wire being supported by the rollers in reaches between adjacent rollers, each reach including multiple generally parallel lengths of the wire for cutting multiple wafers from the ingots, at least one of the reaches defining a cutting web;

the ingot support being adapted for mounting at least one ingot thereon in registration with the cutting web and with longitudinal axes of said one ingot being generally perpendicular to the lengthwise extent of the wire in the cutting web, the ingot support including:

mounting beams, each adapted for connection of a respective ingot thereto, an adaptor for holding said mounting beams, the adaptor being configured for holding multiple mounting beams for mounting multiple ingots on the ingot support, and a loading platform having a receptacle configured to selectively receive either one of the mounting beams for mounting a single ingot for sawing or to receive said adaptor, said one receptacle thereby providing capability for converting the wire saw between configurations for slicing one ingot free from said adaptor and for slicing multiple ingots with said adaptor;

the frame mounting the cutting head and ingot support for relative motion such that the ingots mounted on the ingot support pass through the cutting web as the wire is driven in a lengthwise direction for substantially simultaneous slicing of wafers from the ingots by the wire.

7. A wire saw as set forth in claim 6 in combination with four ingots, wherein the adaptor is a double adaptor configured to hold two mounting beams in side-by-side arrangement, a first of said ingots being attached to a first of the mounting beams mounted on the adaptor, a second of said ingots being attached to a second of the mounting beams mounted on the adaptor, a third of said ingots being connected to a third mounting beam mounted on said first ingot and a fourth of said ingots being attached to a fourth mounting beam mounted on said second ingot.

8. A wire saw as set forth in claim 6 in combination with six ingots, wherein the adaptor is a triple adaptor configured to hold three mounting beams in side-by-side arrangement, a first of said ingots being attached to a first of the mounting beams mounted on the adaptor, a second of said ingots being attached to a second of the mounting beams mounted on the adaptor, a third of said ingots being attached to a third of the mounting beams mounted on the adaptor, a fourth of said ingots being attached to a fourth of the mounting beams mounted on said first ingot, a fifth of said ingots being connected to a fifth of the mounting beams mounted on said second ingot, and a sixth of said ingots being attached to a sixth of the mounting beams mounted on said third ingot.

9. A wire saw as set forth in claim 6 further comprising a slurry delivery system including nozzles, each nozzle being positioned for dispensing slurry at distinct locations along the wire web generally at lateral sides of each of the mounting beams.

10. A wire saw as set forth in claim 9 further comprising two bars extending away from at least one of said nozzles, each bar extending from a location generally at an end of said at least one nozzle, the bars defining edges of a curtain of dispensed slurry.

11. A wire saw as set forth in claim 6 further comprising a central support configured for engagement by said cutting web to limit deflection of said cutting web when engaging ingots.

12. A wire saw as set forth in claim 6 wherein the ingot support mounts at least two ingots with longitudinal axes of the ingots being parallel and non-coaxial.

\* \* \* \* \*